…

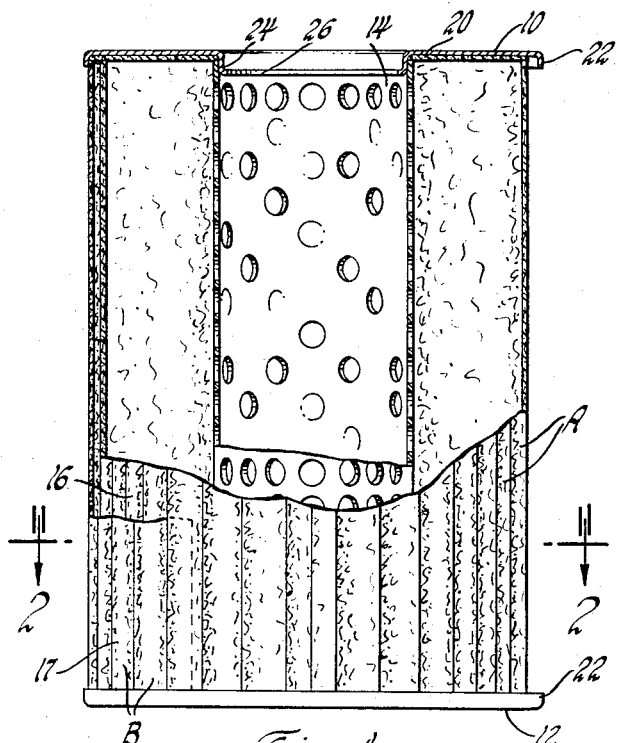
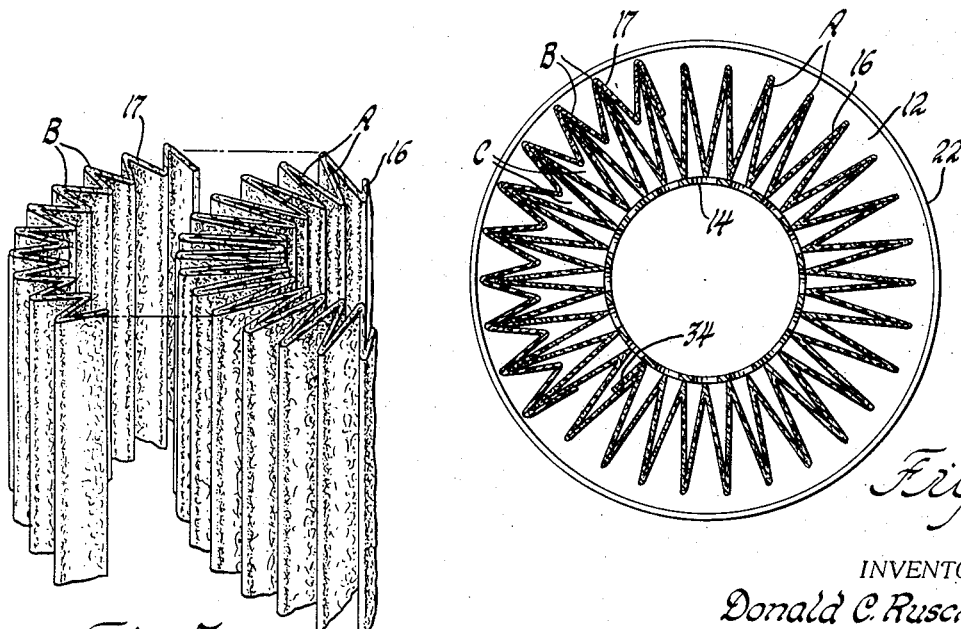

United States Patent Office 3,368,687
Patented Feb. 13, 1968

---

3,368,687
SERIES PARALLEL SHEET MEDIA FILTER ELEMENT
Donald C. Ruschman, Davison, Mich., assignor to General Motors Corporation, Detroit, Mich., a corporation of Delaware
Filed Jan. 11, 1965, Ser. No. 424,609
2 Claims. (Cl. 210—457)

This invention relates to liquid filters and more particularly to filter elements adapted to be inserted in systems for conveying and clarifying oil such as engine lubricating oil.

An object of the present invention is to provide an improved filter element of low cost and capable of removing dirt particles of a predetermined minimum size from a fluid such as lubricating oil and which is capable of remaining effective for an extended period of time before a need of replacement of the element is indicated.

A feature of the invention is a filter element having two portions of surface type or sheet-form filtering media in series along a fluid path and one of them being extended to serve in parallel as a single sheet media in that path.

Another feature is a filter element having an annulus of a large pleated sheet of filter material of one porosity and an overlay of a smaller sheet of filter material of a different porosity with the smaller sheet extending over a portion only of the surface of the larger sheet.

Another feature is a filter element having a first larger pleated sheet fully traversing a fluid flow path and a second smaller pleated sheet supplementing only a portion of the first larger pleated sheet in that path.

These and other features of the invention will now be described in detail in the specification and then pointed out more particularly in the appended claims.

In the drawings:

FIGURE 1 is an elevation view with parts broken away, illustrating one embodiment of the present invention;

FIGURE 2 is a sectional view looking in the direction of the arrows 2—2 of FIGURE 1; and FIGURE 3 is an exploded view of portions of two sheet-form filtering media used in the assembly of FIGURES 1 and 2.

Heretofore, oil has been clarified by causing it to pass through mass or depth type filtering media of different porosities and as arranged in parallel with reference to a fluid flow path. Such a concept is taught in the U.S. Patent No. 2,559,267, granted July 3, 1951, in the names of Winslow, Nostrand and Moore. It is also known to clarify fluid by passing it through a sheet of filter material densified or compressed in portions to secure different flow rates through the sheet. Such a concept is taught in the U.S. Patent No. 3,125,515, granted Mar. 17, 1964, in the names of Gruner and Abeles. These concepts are at variance with the instant disclosure which deals with a series-parallel arrangement and which is an improvement over the teaching in the U.S. patent application Ser. No. 373,977, filed June 10, 1964, in the names of Ruschman and Schulte.

In FIGURE 1, a filter element is shown which comprises two end plates 10 and 12 connected by a perforated center tube 14 and two sheets of filter media 16 and 17. Each end plate 10 or 12 is jointed to the center tube 14 and each of the sheets 16 and 17 by means of an adhesive or sealing composition such as shown at 20. The outer margin of each of the end plates 10 and 12 is flanged at 22 to lend rigidity and each plate also bears an indentation such as at 24 to serve as locater or centering means for the center tube 14. The end plate 10 is centrally apertured as at 26 and such aperture could be used but it not essential in the plate 12.

The sheet 16 consists of a pleated sheet annulus wrapped around the tube 14. The series of these pleats A forms a continuous band extending around the tube 14 with the first and last pleat joined and sealed as at 34 (FIGURE 2) by means of an adhesive. The inner apices of the pleats A contact the tube 14 and the outer apices are spaced a slight distance inwardly from the end plate flanges 22.

The sheet 17, smaller and of a more dense filter media as compared with the sheet 16, is formed with pleats B which are of less width than that of the pleats A so that the outer apices of the pleats B are close to the outer apices of the pleats A and the inner apices of the pleats B are spaced from the inner apices of the pleats A partially to define spaces C. It will be understood that each space C is fully defined by the end plates 10 and 12 and corresponding pleats of the two sheets 16 and 17. The relative widths of the pleats in the sheets 16 and 17 are such that a flow restriction will not arise due to any crowded filter media condition in the vicinity of the center tube 14 where the folds would otherwise closely nest or converge. With the apices arranged as described, sufficient support to prevent the outer pleats B from collapsing inward due to differential fluid pressure during use is provided, this being on the assumption that fluid flow will be inward and toward the tube 14.

A number of filtering media could be used in formulating the sheets 16 and 17 and the sheets could be corrugated as well as pleated. It has been found in clarifying automobile lubricating oil that for the inner sheet 16 a filter paper sheet of relatively open structure and from .018 inch to .023 inch thick is suitable and it is advisable to have the paper resin impregnated and cured. A suitable media for the outer sheet 17 or folds B is found to be a relatively dense and unimpregnated filter paper .030 inch to .035 inch thick. For some applications, the paper in the sheet 17 may contain a low percentage of resin to add wet strength but it is desirable that this sheet 17 have maximum absorbency and to exhibit the latter the paper should have a minimum of resin content.

When a dirty oil is presented around the filter element, it is clarified as it is constrained to pass through the two sheets 16 and 17 around a portion of the circumference of the filter element and only through a single layer of sheet 16 at the remaining portion of the circumference of the element. The clarified oil then passes into the perforated center tube 14 and is discharged by way of the opening 26.

It will be appreciated that the sheet 16 controls the particle size of impurities which may pass through the filter element and at the same time the sheet 17 with its relatively dense structure serves to extend the life of the element by delaying the plugging of the overlaid portion of the sheet 16. It will be understood that in the event the flow of fluid through the element is reversed, i.e.—directed outwardly—then the pleats must be supported or be made of adequate stiffness to hold up against the differential pressure but the sheet 16 would not plug up as readily when supplemented by the sheet 17 because of the lower flow rate at that area. Such a concept is within the purviews of the present invention.

The filter element is capable of performing an efficient job in cleaning engine oil and protecting engines from damaging dirt particles because:

(1) It is capable of serving as a full flow element in which all oil enroute to the engine gallery must pass through the filter element;

(2) The continuous or inner sheet 16 controls the size of the particles permitted to pass through the element;

(3) The two sheets 16 and 17 form a shunt section through which only a small fraction of the total oil flow will pass. This reduced rate of flow through both papers is conducive to fine filtration.

I claim:

1. A filter element defining a flow path for liquid, said element comprising a cartridge having end caps, a central perforated tube joining said end caps, an opening in one of said end caps and communicating with said tube, a first large sheet of filtering material formed into a series of pleats extending completely around said tube with inner folds of said pleats contacting said tube, a second smaller sheet of filtering material coextensive with and overlying an arcuate portion only of said first large sheet and nested with said arcuate portion to contact the apices only of some of the outer folds of the latter, said second smaller sheet having opposed edges sealed to said end caps and to said first large sheet to define an arcuate series of spaces separated by only some of said pleats, and the porosity of one of said sheets being greater than the porosity of the other of said sheets.

2. A filter element as set forth in claim 1, the said second smaller sheet being pleated and having a porosity more open than that of said large sheet, and each pleat of said small sheet intermediate opposite margins of said small sheet having an apex extending inwardly and between adjacent pleats of said large sheet.

References Cited

UNITED STATES PATENTS

| 2,675,127 | 4/1954 | Layte | 210—493 |
| 3,116,245 | 12/1963 | McNabb | 210—493 X |

FOREIGN PATENTS

| 1,130,459 | 9/1956 | France. |
| 1,368,602 | 6/1964 | France. |
| 758,329 | 10/1956 | Great Britain. |
| 823,648 | 1/1959 | Great Britain. |
| 999,562 | 7/1965 | Great Britain. |

SAMIH N. ZAHARNA, *Primary Examiner.*

REUBEN FRIEDMAN, *Examiner.*

F. MEDLEY, *Assistant Examiner.*